(12) United States Patent
Joo

(10) Patent No.: US 10,773,555 B2
(45) Date of Patent: Sep. 15, 2020

(54) KERF OF WINTER TIRE

(71) Applicant: HANKOOK TIRE CO., LTD., Seoul (KR)

(72) Inventor: Sang Tak Joo, Daejeon (KR)

(73) Assignee: HANKOOK TIRE CO., LTD. (KR)

( * ) Notice: Subject to any disclaimer, the term of this patent is extended or adjusted under 35 U.S.C. 154(b) by 193 days.

(21) Appl. No.: 15/918,127

(22) Filed: Mar. 12, 2018

(65) Prior Publication Data

US 2018/0354311 A1   Dec. 13, 2018

(30) Foreign Application Priority Data

Jun. 8, 2017   (KR) .......................... 10-2017-0071675

(51) Int. Cl.
  *B60C 11/11* (2006.01)
  *B60C 11/12* (2006.01)
  *B60C 11/03* (2006.01)

(52) U.S. Cl.
  CPC ........... *B60C 11/11* (2013.01); *B60C 11/0323* (2013.01); *B60C 11/1218* (2013.01);
  (Continued)

(58) Field of Classification Search
  CPC ............. B60C 11/1281; B60C 11/0323; B60C 11/1218; B60C 2011/1259
  (Continued)

(56) References Cited

U.S. PATENT DOCUMENTS 5,918,654 A * 7/1999 Bossut .................... B60C 11/12
                                                                  152/209.14
2005/0150582 A1* 7/2005 Matsumura ........ B29D 30/0606
                                                                  152/209.18
(Continued)

FOREIGN PATENT DOCUMENTS

EP          3354486 A1    8/2018
JP          S59199306 A   11/1984
(Continued)

OTHER PUBLICATIONS

English Translation of Nakamura, Hiroshi JP-02310108-A (Year: 1990).*

(Continued)

*Primary Examiner* — Robert C Dye
*Assistant Examiner* — Edgaredmanuel Troche
(74) *Attorney, Agent, or Firm* — Renaissance IP Law Group LLP

(57) ABSTRACT

Disclosed herein is a kerf of a winter tire capable of easily discharging snow therefrom and further improving braking performance and drainage performance on a wet road. The kerf includes a kerf inlet portion formed in the shape of a sawtooth-type zigzag wave in a block of one of a tread and a shoulder of the tire in the circumferential direction of the tire, a pipe-shaped flow passage portion formed in a lower portion of the block and having a width that is greater than or equal to the width of the kerf inlet portion, and a connection channel for connecting the kerf inlet portion and the flow passage portion to each other. The sawtooth-type zigzag wave has an amplitude that gradually decreases in the depth direction of the block, and the connection channel has a width that gradually decreases from the kerf inlet portion to the flow passage portion.

15 Claims, 3 Drawing Sheets

(52) U.S. Cl.
CPC ...... *B60C 11/1259* (2013.01); *B60C 11/1281* (2013.01); *B60C 2011/1213* (2013.01)

(58) Field of Classification Search
USPC .................................................. 152/209.18
See application file for complete search history.

(56) References Cited

U.S. PATENT DOCUMENTS

| | | | | |
|---|---|---|---|---|
| 2009/0038723 | A1* | 2/2009 | Thiebaud | B60C 11/0306 152/209.18 |
| 2011/0168311 | A1* | 7/2011 | Voss | B60C 11/1218 152/209.18 |
| 2013/0153106 | A1* | 6/2013 | Clemmer | B60C 11/1281 152/209.23 |
| 2015/0202927 | A1* | 7/2015 | Korkama | B60C 11/1307 152/209.18 |
| 2015/0352904 | A1* | 12/2015 | Bolzoni | B60C 11/1218 152/209.18 |
| 2018/0104992 | A1* | 4/2018 | Vantal | B60C 11/01 |

FOREIGN PATENT DOCUMENTS

| | | | | |
|---|---|---|---|---|
| JP | 02310108 | A | * | 12/1990 |
| JP | H02310108 | A | | 12/1990 |
| JP | H0994829 | A | | 4/1997 |
| JP | 2000177329 | A | | 6/2000 |
| JP | 2000211321 | A | | 8/2000 |
| JP | 2003118322 | A | | 4/2003 |
| JP | 2005193770 | A | | 7/2005 |
| JP | 2005193815 | A | | 7/2005 |
| JP | 2006168462 | A | * | 6/2006 |
| JP | 2006168462 | A | | 6/2006 |
| JP | 2006298057 | A | | 11/2006 |
| JP | 2009149297 | A | | 7/2009 |
| JP | 2011088468 | A | | 5/2011 |
| JP | 2012501914 | A | | 1/2012 |
| JP | 2015500179 | A | | 1/2015 |
| KR | 101037410 | B1 | | 5/2011 |
| KR | 101287507 | B1 | | 7/2013 |
| KR | 101411093 | B1 | | 7/2014 |
| KR | 20160022057 | A | | 2/2016 |
| WO | 2012164449 | A1 | | 12/2012 |
| WO | WO-2016156705 | A1 | * | 10/2016 ......... B60C 11/1281 |

OTHER PUBLICATIONS

English Translation of Saeki, Kentaro JP-2006168462-A (Year: 2006).*

Extended European Search Report for Application No. 18154815.7 dated Jul. 18, 2018.

* cited by examiner

KERF OF WINTER TIRE

CROSS-REFERENCE TO RELATED APPLICATION

This application claims priority to and the benefit of Korean Patent Application No. 10-2017-0071675 filed in the Korean Intellectual Property Office on Jun. 8, 2017, the entire contents of which are incorporated herein by reference.

BACKGROUND

1. Technical Field

The present disclosure relates to a kerf of a winter tire, and more particularly to a kerf of a winter tire that is capable of easily discharging snow therefrom while additionally further improving braking performance and drainage performance on a wet road.

2. Description of the Related Art

In general, a tire is one of the components constituting a vehicle. The tire directly contacts a road surface. Air in the tire absorbs shocks like a spring. Specifically, the air in the tire absorbs shocks generated due to irregularity of the road surface to improve comfort in driving of the vehicle.

The tire includes a tread, which is a rubber layer that contacts the road surface, a sidewall connected to the tread, the sidewall constituting a side surface of the tire, a bead connected to the sidewall, the bead being fixed to a rim of each wheel of the vehicle, a carcass mounted in the tire, the carcass forming a framework of the tire and exhibiting high fatigue resistance to bending and stretching of the sidewall, and a belt disposed between the tread and the carcass in order to protect the carcass and improve the rigidity of the surface of the tread. The tread includes a block and a groove. A kerf is formed in the block. The rigidity of the block is appropriately adjusted by the kerf so as to satisfy the requirements of the tire.

The application of the kerf to the surface of the tire provides better braking, steering, and traction performance on a snowy road. However, the application of the kerf lowers the rigidity of the tread block and degrades handling performance on a dry road or a wet road. Therefore, three-dimensional kerfs have recently been developed to prevent deterioration in rigidity attributable to application of the kerfs.

A three-dimensional tread kerf is disclosed in Korean Patent Laid-open Publication No. 2016-0022057, filed by the present applicant. Korean Patent Laid-open Publication No. 2016-0022057 discloses a tread kerf of a snow tire that is capable of securing the performance (steering, braking, traction, etc.) of the tire on a dry road and a wet road while additionally securing the performance of the tire on a snowy road and an icy road and that is capable of maintaining uniform rigidity of the block irrespective of the directionality of the kerf, maximizing the interlocking effect at the large surfaces, and maintaining uniform traction performance of the tire even when the tire is severely worn.

In addition, Korean Patent Registration No. 10-1037410 filed by the present applicant discloses a tread kerf of a heavy-duty tire that has improved heat-dissipation performance, improved durability, and improved drainage performance, thereby securing higher braking performance of the tire on a wet road.

However, because the amount of snowfall has recently decreased due to abnormally high temperatures in the winter, there is a need for a tire having further improved braking performance and drainage performance on a wet road while maintaining the function of the kerf on a snowy road.

When the tire rolls on a snowy road, snow may be introduced into a small gap defined by the kerf. This lowers a so-called "cohesion effect", which is generated when the kerf scrapes compressed snow. Therefore, it is required to discharge snow from the kerf.

A snow tire having improved snow discharge performance is disclosed in Korean Patent Registration No. 10-1287507, filed by the present applicant. Korean Patent Registration No. 10-1287507 discloses a pneumatic heavy-duty snow tire, in which snow-discharge grooves are formed in the block, which is arranged between the grooves, at regular intervals in the circumferential direction of the tire and in which compressed air passages extend at an incline from the surface of the block to portions near the bottoms of the snow-discharge grooves, thereby rapidly discharging snow, which is introduced into a gap in the block of the tread when the block contacts snow on the surface of a snowy road, consequently improving the snow performance of the tire.

SUMMARY

Therefore, the present disclosure has been made in view of the above problems, and it is an object of the present disclosure to provide a kerf of a winter tire that is capable of easily discharging snow therefrom, thereby maintaining the function of the kerf on a snowy road while additionally further improving braking performance and drainage performance on a wet road.

In accordance with an aspect of the present disclosure, the above and other objects can be accomplished by the provision of a kerf of a winter tire, the kerf including a kerf inlet portion formed in a shape of a sawtooth-type zigzag wave in a block of one of a tread and a shoulder of a tire in a circumferential direction of the tire, a pipe-shaped flow passage portion formed in a lower portion of the block, the flow passage portion having a width that is greater than or equal to a width of the kerf inlet portion, and a connection channel for connecting the kerf inlet portion and the flow passage portion to each other, wherein the sawtooth-type zigzag wave has an amplitude that gradually decreases in a depth direction of the block, and the connection channel has a width that gradually decreases from the kerf inlet portion to the flow passage portion.

The kerf may further include a water column portion formed at a portion of the sawtooth-type zigzag wave in order to absorb water present near the kerf on the surface of the tire. The water column portion may extend so as to be inclined toward a drain hole formed in the flow passage portion. The water column portion may be configured as a pipe that has a circular-shaped cross-section or a polygonal-shaped cross-section, or may be configured as a sandglass-type pipe.

The width of the connection channel at the kerf inlet portion may range from 0.4 mm to 2 mm, and the width of the connection channel at the flow passage portion may range from 0.3 mm to 1 mm. The amplitude of the sawtooth-type zigzag wave at the kerf inlet portion may range from 2 mm to 10 mm, and the amplitude of the sawtooth-type zigzag wave at the flow passage portion may be 0 mm.

The kerf may further include a kerf bottom portion formed under the flow passage portion. The kerf may have a depth ranging from 1 mm to 10 mm.

The width (or the diameter) of the flow passage portion or the water column portion may be set greater than or equal to the width of the connection channel at the kerf inlet portion. The flow passage portion may be configured as a pipe that has a circular-shaped cross-section, a triangular-shaped cross-section or a diamond-shaped cross-section. The flow passage portion may include a diameter-increasing portion formed at a distal end thereof. The diameter-increasing portion may have a diameter that is larger than the diameter of the flow passage portion. The flow passage portion may be formed in the shape of a venturi meter.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Figure 1A:
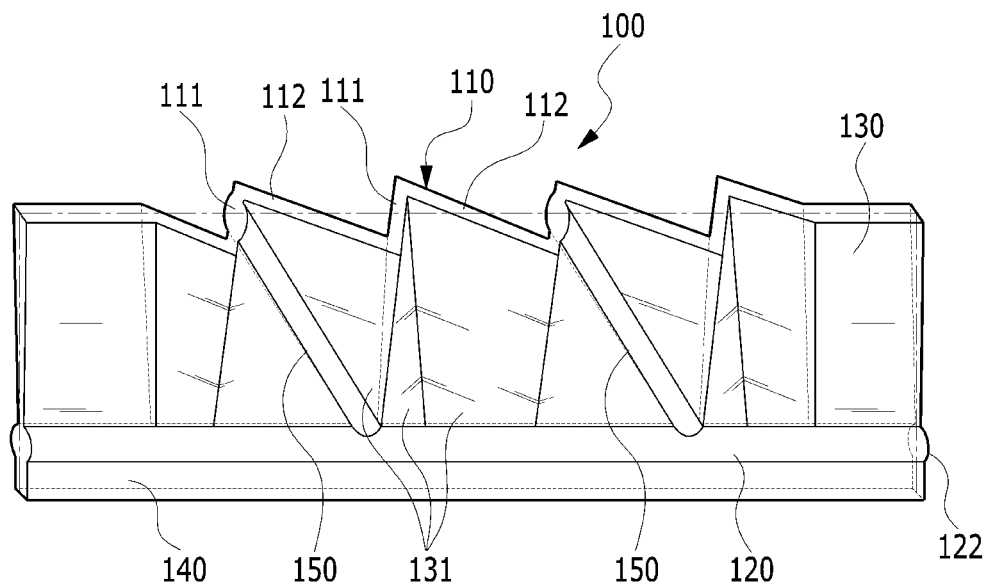
FIGS. 1a and 1b are, respectively, a perspective view and a side view illustrating a kerf of a winter tire according to an embodiment of the present disclosure.

Reference will now be made in detail to the preferred embodiments of the present disclosure, examples of which are illustrated in the accompanying drawings. Wherever possible, the same reference numbers will be used throughout the drawings to refer to the same or like parts. In addition, a detailed description of known functions and configurations incorporated herein will be omitted when it may make the subject matter of the present disclosure rather unclear. In the drawings, some components are exaggerated, omitted, or schematically shown for the same reason.

Figure 1B:
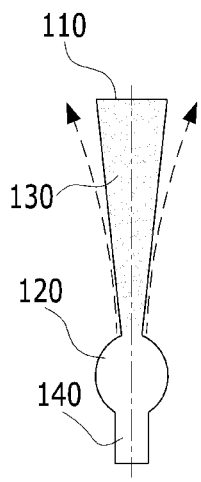
Figure 2:
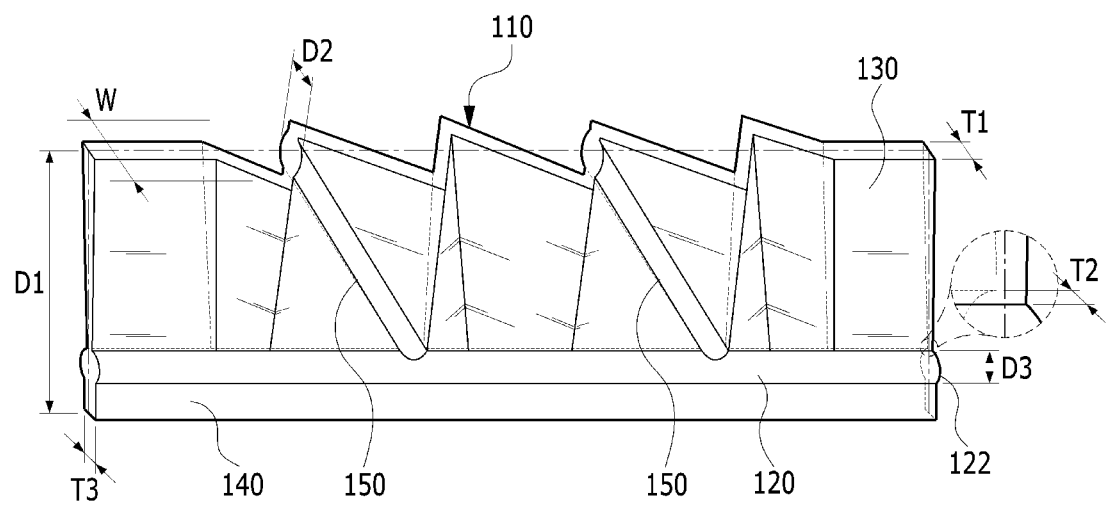
FIG. 2 is a view for explaining the size of the kerf in FIG. 1.

FIGS. 1a and 1b are, respectively, a perspective view and a side view illustrating a kerf of a winter tire according to an embodiment of the present disclosure. FIG. 2 is a view for explaining the size of the kerf in FIG. 1. As shown in the drawings, a tread kerf 100 according to the embodiment of the present disclosure is formed at a tread block or a shoulder block of a tire, and includes a kerf inlet portion 110, a flow passage portion 120, a connection channel 130, and a kerf bottom portion 140.

In a winter tire, a tread pattern thereof has a great influence on various aspects of performance of the tire. In particular, a shoulder block plays an important role in major required performance aspects of a winter tire, for example, starting and accelerating on a snowy road, braking on a wet road, etc. In the description below, the term "block" refers to a tread block and a shoulder block of a tire, in which kerfs are formed. For convenience of explanation, descriptions will be mainly provided for the tread block. The shoulder is a rubber region in a tire, which is formed between the side wall and the tread.

The kerf inlet portion 110 is formed in the block in the shape of a sawtooth-type zigzag wave in the circumferential direction of the tire. This sawtooth-type zigzag wave is formed such that the amplitude thereof gradually decreases along the connection channel 130 in the depth direction of the block. That is, the amplitude of the sawtooth-type zigzag wave at the middle portion of the connection channel 130 in the depth direction thereof is smaller than that of the sawtooth-type zigzag wave at the kerf inlet portion 110. The amplitude W of the sawtooth-type zigzag wave at the kerf inlet portion 110 ranges from 2 to 10 mm, and the amplitude W of the sawtooth-type zigzag wave at the flow passage portion 120 is 0 mm.

The flow passage portion 120 is formed in the shape of a pipe having a width (or a diameter D3) that is greater than or equal to the width of the connection channel 130 at the kerf inlet portion 110. The flow passage portion 120 serves as a drainpipe. That is, water, which is introduced through the kerf inlet portion 110, flows through the connection channel 130 and a water column portion (which will be described later), and is then discharged in the horizontal direction through the flow passage portion 120. Specifically, the flow passage portion 120 is configured as a cylindrical-shaped pipe that is formed in the circumferential direction of the tire. The flow passage portion 120 has a drain hole 122 formed in one end thereof.

The flow passage portion 120 is configured such that the flow rate of the air flowing therethrough is maintained fast due to a pressure difference, thereby improving heat dissipation performance and durability of the tire, and such that water is discharged quickly therethrough due to the pressure difference. The flow passage portion 120 may be configured as a pipe that has a circular-shaped cross-section, a triangular-shaped cross-section or a diamond-shaped cross-section.

The connection channel 130 is a passage that connects the kerf inlet portion 110 and the flow passage portion 120 to each other. Because the amplitude of the sawtooth-type zigzag wave gradually decreases in the depth direction of the block, the connection channel 130 has a vertical side surface 131 that is distorted. The width T1 of the connection channel 130 gradually decreases from the kerf inlet portion 110 to the flow passage portion 120. It is desirable for the width T1 of the connection channel 130 at the kerf inlet portion 110 to be in the range from 0.4 mm to 2 mm and for the width T2 of the connection channel 130 at the flow passage portion 120 to be in the range from 0.3 mm to 1 mm.

The sawtooth-type zigzag wave is provided at a portion thereof with a water column portion 150 that extends through the connection channel 130 in order to absorb water that is present near the kerf on the surface of the tire. This water column portion 150 extends downwards from the kerf inlet portion 110 to the flow passage portion 120 so as to be inclined at a predetermined angle toward the drain hole 122 in the flow passage portion 120. Described in detail, the sawtooth-type zigzag wave is formed in a manner such that a combination of an upright surface 111 and an inclined surface 112 is repeatedly formed, and the water column portion 150 extends downwards at an incline from the upright surface 111 located at the kerf inlet portion 110 to the next upright surface 111 located at the flow passage portion 120 via the inclined surface 112 formed between the two adjacent upright surfaces 111. The two opposite ends of the water column portion 150 respectively communicate with the kerf inlet portion 110 and the flow passage portion 120.

The water column portion 150 is formed in a pipe shape, which has a width (or a diameter D2) that is greater than or equal to the width of the connection channel 130 at the kerf inlet portion 110. The water column portion 150 may be configured as a pipe that has a circular-shaped cross-section or a polygonal-shaped cross-section, or may be configured as a sandglass-type pipe that has two broad opposite ends linked by a narrow channel.

When the tire rolls on a wet road, the water column portion 150 sucks water that is present between the tread of the tire and the road surface, thereby enabling the tread of the tire to directly contact the road surface.

The kerf bottom portion 140 is a portion that is formed under the flow passage portion 120. This kerf bottom portion 140 may be omitted. It is desirable for the width T3 of the kerf bottom portion 140 to have an intermediate value between the width T1 and the width T2 of the connection channel 130. It is desirable for the depth D1 of the kerf to have a value ranging from 1 mm to 10 mm.

The kerf 100 of a winter tire, configured as described above, serves to maintain the constant rigidity of the block (the tread block or the shoulder block), which may be deteriorated due to the formation of the kerf in the block and which may undesirably increase due to wear of the tire. According to the present disclosure, water, which is introduced into the kerf, is easily discharged outside the tire from the block in the lateral direction, as indicated by the dotted arrows in FIG. 3.

In addition, due to the configuration of the kerf formed in the surface of the tire in consideration of the snow performance of the tire, that is, the configuration in which the width of the kerf gradually decreases in the depth direction thereof, the linear contact between the kerf in the block and the ground increases, thereby improving starting and acceleration performance on a snowy road and consequently exhibiting the intrinsic function of the kerf properly. In addition, when the tire rolls on a snowy road, snow introduced into the gap defined by the kerf is easily discharged therefrom. That is, due to the configuration in which the width of the kerf at the surface of the tire (the kerf inlet portion 110) is the greatest and the width of the kerf at the flow passage portion 120 is the smallest, snow is naturally moved from the lower portion of the kerf to the surface of the tread, as indicated by the dotted arrows in FIG. 1b.

Figure 3:
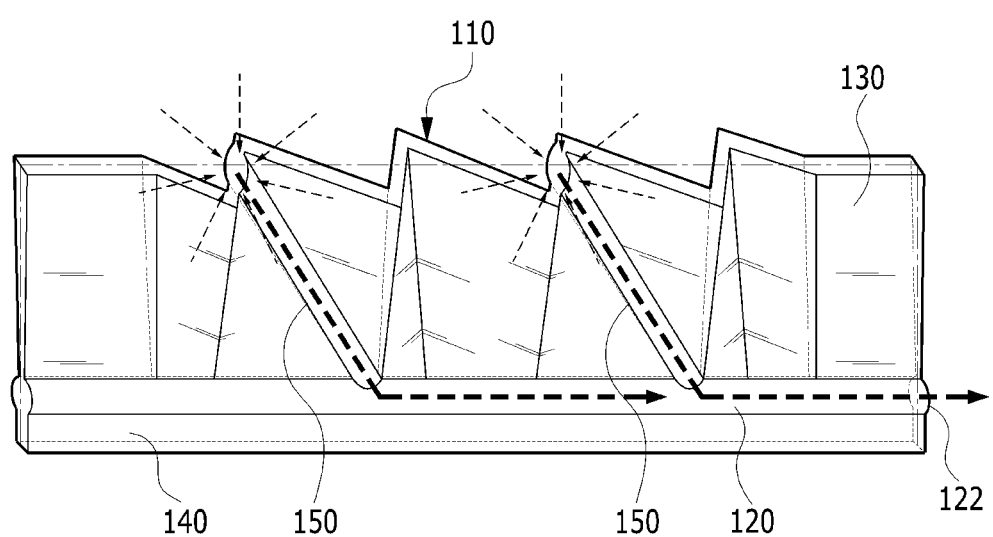
FIG. 3 is a view for explaining absorption and discharge of water into and from the kerf of the winter tire according to the embodiment of the present disclosure.

In addition, as shown in FIG. 3, water present on the surface of the block is absorbed into the water column portion 150 through an entrance thereof, moves to the flow passage portion 120 via the water column portion 150, which is inclined downwards toward the drain hole 122, and is discharged outside through the drain hole 122, which is formed in the side surface of the tire. Therefore, it is possible to minimize the length of the drain route along which water moves from the surface of the block to the side surface of the tire.

Water present on the surface of the tread block interrupts contact between the tread rubber and the road surface, and thus degrades the function of the tire on a wet road. However, according to the kerf of the present disclosure, water present on the surface of the tread is absorbed into the water column portion, and is easily discharged to the side surface of the tread block via the drain hole, thereby greatly increasing contact between the tread block and the ground.

In addition, according to the kerf of the winter tire of the present disclosure, it is possible to further improve the drainage performance by modifying the flow passage portion to various other configurations depending on the functions required for the tire.

Figure 4:
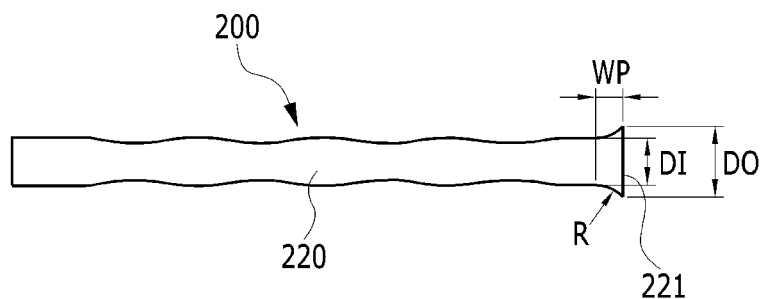
FIG. 4 is a view illustrating a flow passage portion of a kerf of a winter tire according to another embodiment of the present disclosure.

FIG. 4 is a view illustrating a flow passage portion of a kerf of a winter tire according to another embodiment of the present disclosure. A kerf 200 according to the other embodiment includes a flow passage portion 220, which includes a diameter-increasing portion 221 formed at an end thereof. The diameter-increasing portion 221 is formed such that the distal end thereof has a diameter DO that is larger than a diameter DI of the flow passage portion 220. The flow passage portion 220 is formed in the shape of a venturi meter. The diameter-increasing portion 221 is formed in a flared shape. The diameter-increasing portion 221 is formed to be curved such that the diameter DO of the distal end of the dimeter-increasing portion 221 is larger than the diameter DI of the flow passage portion 220 by 20% or more. The diameter-increasing portion 221, which is formed to be curved, has an effect of reducing the occurrence of cracking at the edge portion thereof. As mentioned above, it is desirable for the diameter DO of the distal end of the dimeter-increasing portion 221 to be set larger than the diameter DI of the flow passage portion 220 by 20% or more. It is more desirable for the diameter DO to be set 20% to 100% larger than the diameter DI in consideration of the correlation between drainage efficiency and the rigidity of the tread block.

Even when a crack occurs at the edge portion of the diameter-increasing portion 221, the phase difference due to the difference in the diameter between the flow passage portion 220 and the distal end of the diameter-increasing portion 221 prevents the crack from spreading to the flow passage portion 220. In addition, the increase in the diameter of the distal end of the diameter-increasing portion 221, that is, the outlet port thereof, increases the amount of drainage, and consequently, improves the drainage performance.

It is desirable to set the diameter DI of the flow passage portion 220 to be 2 mm or more. It is desirable to set the width WP of the diameter-increasing portion 221, which is the distance from the distal end of the diameter-increasing portion 221 to a point of the flow passage portion 220 from which the diameter-increasing portion 221 originates, to be 1 mm or more. It is desirable to set the radius of curvature R of the outer curved surface of the diameter-increasing portion 221 to be 1 mm or more.

Since the remaining configuration of the kerf 200 according to this embodiment is identical to or similar to that of the embodiment illustrated in FIG. 1, an explanation thereof will be omitted.

As is apparent from the above description, the kerf of the winter tire according to the present disclosure has an effect of maintaining the function of the kerf on a snowy road while additionally further improving braking performance and drainage performance on a wet road. In addition, when the tire rolls on a snowy road, snow introduced into the gap defined by the kerf is easily discharged outside the block of the tire via the surface of the tire due to the configuration in which the width of the kerf gradually decreases from the kerf inlet portion in the depth direction of the block of the tire.

Although the preferred embodiments of the present disclosure have been disclosed for illustrative purposes, those skilled in the art will appreciate that various modifications, additions and substitutions are possible, without departing from the scope and spirit of the invention as disclosed in the accompanying claims.

What is claimed is:

1. A tread for a tire, comprising:
a kerf comprising a kerf inlet portion formed in a block of one of the tread and a shoulder of the tire, the kerf inlet portion comprising a sawtooth-type zigzag wave shape formed in a circumferential direction of the tire, the sawtooth-type zigzag wave shape comprising a first portion and a second portion that repeatedly form the sawtooth-type zigzag wave shape, the first portion alternating with the second portion;

a pipe-shaped flow passage portion formed in a lower portion of the block, the flow passage portion having a width that is greater than or equal to a width of the kerf inlet portion;

a connection channel for connecting the kerf inlet portion and the flow passage portion to each other; and a water column portion formed at the kerf inlet portion at a first portion of the sawtooth-type zigzag wave shape and extending in an inclined direction to the flow passage portion at a next first portion of the sawtooth-type zigzag wave shape, wherein the sawtooth-type zigzag wave shape has an amplitude that gradually decreases in a depth direction of the block, and the connection channel has a width that gradually decreases from the kerf inlet portion to the flow passage portion.

2. The tread for a tire according to claim 1, wherein a width of the connection channel at the kerf inlet portion ranges from 0.4 mm to 2 mm, and a width of the connection channel at the flow passage portion ranges from 0.3 mm to 1 mm.

3. The tread for a tire according to claim 1, wherein an amplitude of the sawtooth-type zigzag wave shape at the kerf inlet portion ranges from 2 mm to 10 mm, and an amplitude of the sawtooth-type zigzag wave shape at the flow passage portion is 0 mm.

4. The tread for a tire according to claim 1, further comprising:

a kerf bottom portion formed under the flow passage portion.

5. The tread for a tire according to claim 1, wherein the kerf has a depth ranging from 1 mm to 10 mm.

6. The tread for a tire according to claim 1, wherein the flow passage portion comprises a diameter-increasing portion formed at a distal end thereof, and wherein the diameter-increasing portion has a diameter that is larger than a diameter of the flow passage portion.

7. The tread for a tire according to claim 1, wherein the flow passage portion is formed in a shape of a venturi meter.

8. A tire tread for a tire, comprising:

a kerf comprising a kerf inlet portion formed at a surface of one of a tread block and a shoulder of the tire, the kerf inlet portion comprising a sawtooth-type zigzag wave shape portion formed in a circumferential direction of the tire, the sawtooth-type zigzag wave shape portion comprising a first segment and a second segment that alternatingly repeat to form the sawtooth-type zigzag wave shape, an amplitude of the sawtooth-type zigzag wave shape gradually decreasing as a depth away from the surface increases;

a flow passage portion formed at a lower portion of the kerf, the flow passage portion comprising a pipe shape having a width that is greater than or equal to a width of the kerf inlet portion;

a connection channel that connects the kerf inlet portion and the flow passage portion, the connection channel comprising a width that gradually decreases from the kerf inlet portion to the flow passage portion; and a water column portion formed at the kerf inlet portion of a first segment of the sawtooth-type zigzag wave shape and that extends in an inclined direction to the flow passage portion at a next first segment of the sawtooth-type zigzag wave shape.

9. The tire tread according to claim 8, wherein the sawtooth-type zigzag wave shape portion further comprises a third segment and a fourth segment, the third segment and the fourth segment each comprise a linear shape that extends in the circumferential direction of the tire, the third segment being adjacent to a first segment and the fourth segment being adjacent to a second segment.

10. The tire tread according to claim 8, wherein a width of the connection channel at the kerf inlet portion ranges from 0.4 mm to 2 mm, and a width of the connection channel at the flow passage portion ranges from 0.3 mm to 1 mm.

11. The tire tread according to claim 8, wherein an amplitude of the sawtooth-type zigzag wave shape at the kerf inlet portion ranges from 2 mm to 10 mm, and an amplitude of the sawtooth-type zigzag wave shape at the flow passage portion is 0 mm.

12. The tire tread according to claim 8, further comprising a kerf bottom portion formed under the flow passage portion.

13. The tire tread according to claim 8, wherein the kerf has a depth ranging from 1 mm to 10 mm.

14. The tire tread according to claim 8, wherein the flow passage portion further comprises a diameter-increasing portion formed at a distal end thereof, and wherein the diameter-increasing portion comprises a diameter that is larger than a diameter of the flow passage portion.

15. The tire tread according to claim 8, wherein the flow passage portion is formed in a shape of a venturi meter.

* * * * *